United States Patent Office 3,049,418
Patented Aug. 14, 1962

3,049,418
FERTILIZERS
Geoffrey George Brown, Woodbridge, and Roy Geoffrey Wilson, Ipswich, England, assignors to Fisons Fertilizers Limited, Felixstowe, England, a British company
No Drawing. Filed June 15, 1960, Ser. No. 36,148
Claims priority, application Great Britain June 24, 1959
13 Claims. (Cl. 71—39)

The present invention relates to improvements in the manufacture of fertilizers.

Fertilizers normally comprise mixtures of salts containing the elements required for plant nutrition, namely nitrogen, phosphorus and potassium. The nitrogen in such mixtures is normally derived from ammonium salts such as ammonium sulphate, ammonium nitrate and the like, or other nitrogeneous materials such as nitric acid and urea; the phosphorus is usually derived from phosphate rock; and the potassium is normally derived from a potassium salt such as potassium chloride.

Naturally occurring phosphate rock contains phosphate which generally is unavailable or difficultly available as a plant food, and this requires to be treated to convert the phosphate into a form available as a plant food. Such methods comprise for example treating the phosphate rock with acids or alkalis, the most commonly used method being the acidulation of phosphate rock. In the acidulation of phosphate rock a large number of acids may be used, but the acids used commercially are the strong mineral acids, namely sulphuric acid, phosphoric acid, and nitric acid. These acids may be used alone or in combination together.

The present invention relates particularly to the production of fertilizers involving the acidulation of phosphate rock with nitric acid, with or without other acids. In such processes, one of the salts produced is calcium nitrate, which, as it is markedly hygroscopic is unsuitable for inclusion in a mixed fertilizer. It is known that the calcium nitrate may be treated with potassium sulphate to form calcium sulphate and potassium nitrate. However by the addition of potassium sulphate to the product of acidulation of phosphate rock with nitric acid, the reaction does not proceed simply and calcium-potassium double sulphates are frequently formed. These double salts are insoluble in water and their formulation renders the whole process uneconomic. In carrying out this process the precipitates which may be formed comprise gypsum (CaSO$_4$.2H$_2$O), anhydrite (CaSO$_4$), hemihydrate (CaSO$_4$.½H$_2$O) pentasalt (5CaSO$_4$.K$_2$SO$_4$.H$_2$O) and syngenite (CaSO$_4$.K$_2$SO$_4$.H$_2$O). In our copending application Serial No. 36,149 filed June 15, 1960, herewith, there is described such a process wherein the reaction is carried out so that the soluble sulphate concentration is 0.5–4.0% and at a temperature in the range 60–90° C., when the precipitate formed is calcium sulphate substantially in the form of gypsum. It has now been found that by carrying out the reaction continuously and inter alia ensuring that the soluble sulphate concentration is in the range 0.5–8% and at a temperature in the range 90–140° C., the precipitate formed is calcium sulphate substantially in the form of anhydrite. Where the soluble sulphate concentration and temperature fall outside these limits pentasalt and to a lesser degree syngenite are formed with consequent loss of potassium to an insoluble condition.

Accordingly the present invention is for a continuous process for the production of a phosphate fertilizer which comprises acidulating phosphate rock with nitric acid, with or without other acids such as sulphuric acid, adding potassium sulphate in amount such that the soluble sulphate concentration in the liquid phase is maintained in the range 0.5–8%, the reaction temperature at the addition of potassium sulphate being maintained in the range 90–140° C., continuously removing the reaction product, if desired removing these from the precipitated calcium sulphate, and if desired treating the reaction product or the liquor with a neutralising agent.

Where only a low analysis fertilizer is required the anhydrite may be left in the fertilizer. However where a high analysis fertilizer is required the precipitated calcium sulphate must be removed. The fertilizer may be used in the form of the acidic reaction product. More generally however it is desired to obtain a solid substantially neutral product, and the product consequently requires treatment with a neutralising agent, which may comprise for example ammonia or potassium hydroxide. The resulting product may be dried and/or granulated.

The process of the invention including the steps of removal of precipitated calcium sulphate and neutralization leads to the production of a complex, high analysis, nonhygroscopic fertilizer, which contains the elements nitrogen, phosphorus and potassium and which is chloride free.

The neutralizing agent which is used is preferably ammonia, or an ammoniating solution, since inter alia these are the cheapest sources of nitrogen. If desired, however, other neutralizing agents such as potassium carbonate and potassium hydroxide may be used.

In its simplest form the process of the present invention may be represented by the following equations:

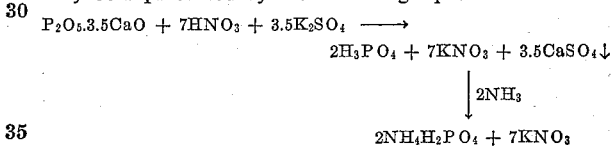

or alternatively using less nitric acid as:

P$_2$O$_5$.3.5CaO+5HNO$_3$+3.5K$_2$SO$_4$→
5KNO$_3$+2KH$_2$PO$_4$+3.5CaSO$_4$↓

In the latter case the resulting product is not markedly acidic and may not require ammoniation. If it is desired to vary the N:P:K ratios this may be achieved, for example by adding nitric acid, phosphoric acid or potassium salts and thereafter ammoniating.

In practice the reactions need not follow exactly the formula indicated above, for example in ammoniation it is possible to obtain a mixture of mono- and diammonium phosphates. The proportion of the neutralizing agent may be greater or less than that indicated above.

The process may be carried out by first acidulating the rock and subsequently adding the sulphate to the product. A preferred embodiment of the invention is for the rock, nitric acid and sulphate reactants to be added simultaneously to the reaction.

An essential feature of the invention is that the process is carried out as a continuous process with continuous addition of the reactants and continuous removal of the product. The process cannot be carried out as a batch process.

Where nitric acid is used alone, it is preferably used in amounts in excess over the molar requirement of 5 moles per mole of P$_2$O$_5$ in the rock. The amount of acid used suitably falls in the range 5–15 moles per mole of P$_2$O$_5$ in the rock. With the use of excess nitric acid, the product will also contain ammonium nitrate, and if desired part of this excess acid may be added later in the process after filtration.

The phosphate rock may, if desired, be acidulated with a mixture of acids comprising nitric acid and sulphuric acid and/or phosphoric acid. With the use of mixed acids the amount of nitric acid may be reduced, if desired, providing however that total acidity of the mixed acids is equivalent to greater than 5 moles of nitric acid per mole of $P_2O_5$ in the rock. The phosphate rock suitably is not finely ground and is of a particle size of about one-sixteenth inch or less.

The nitric acid component of the mixed acids, however, should not be less than 3 moles per mole of $P_2O_5$ in the rock.

Where sulphuric acid, or any other sulphate is employed, this will have an effect on the precipitation of calcium sulphate, and the total sulphate ions present in the liquid phase derived from any source must be in the range 0.5–8%. It will thus be seen that all the components of the reaction mixture are inter-related, and may be adjusted as desired to give a fertilizer of the desired composition.

Where mixed acids are employed in the acidulation step, nitric acid with or without sulphuric acid will always be used in the acidulation stage, where sulphuric acid is used this is preferably added before the filtration stage; other acids may be added immediately after the filtration stage, and may be used mixed together, or used sequentially. Thus for example, when using a mixture of nitric acid, sulphuric acid and phosphoric acid, it may be desirable to treat the phosphate rock first with sulphuric acid and nitric acid and after the filtration stage to add the phosphoric acid. Alternatively, part of the nitric acid may be used to react with the phosphate rock together with the other acids and the remainder added later.

The acids employed in the process of the present invention are preferably used in the form of the commercially available concentrated acids. Thus nitric acid of 40–68% concentration, for example about 57% concentration may be used. Where sulphuric acid is used, this is suitably of a concentration 50–100%, for example about 96% concentration; and where phosphoric acid is used this is suitably a concentration of 50–70%, for example about 60% concentration (expressed as $H_3PO_4$). The phosphate rock employed in the present invention may be any of the phosphate rocks commonly employed, such for example as the calcium phosphate rock which may be obtained for example from Morocco, Rhodesia, Florida, various Pacific Islands, Uganda, Palabora and Kola.

At the addition of potassium sulphate to the system the soluble sulphate concentration in the liquid phase must be 0.5–8%, preferably about 1–3% sulphate, and the reaction temperature must be in the range 90–140° C., preferably 120° C., so that the calcium sulphate is precipitated as anhydrite ($CaSO_4$). When operating at temperatures in the range 90–105° C. part of the calcium sulphate will also be precipitated as gypsum.

The soluble sulphate content may be conveniently maintained in the required range by the use of a continuous stirred tank reactor system. The continuous stirred tank reaction system may comprise one or more tanks. It has been found desirable to carry out the process using a multiple tank reaction system, preferably incorporating three tanks. In the case of a multiple tank reaction system the reaction mixture flows sequentially through the tanks.

In the multiple tank system the phosphate rock and part or all of the nitric and phosphoric acids may be added to the first tank.

The potassium sulphate and sulphuric acid may be added either only to the first tank or to one or more subsequent tanks in accordance with the nature of the reaction. Good agitation is essential in all parts of the reaction system to avoid local high concentrations of soluble sulphate.

The soluble sulphate ion addition requires to be adjusted at all times so that the soluble sulphate concentration in the liquid phase is within the prescribed limits of 0.5–8%. By the reaction of acid with rock in accordance with the process calcium ions are released and these react with the sulphate ions to form calcium sulphate which is precipitated. Consequently therefore the soluble sulphate concentration in the liquid phase represents the available sulphate ions which are in excess of the available calcium ions. In order to maintain the soluble sulphate concentration within the prescribed limits of 0.5–8% the rate of addition of sulphate ions must not be substantially in excess of the rate of formation of calcium ions by the acid degradation of the phosphate rock.

In general the acid degradation of the rock is rapid and in such cases the whole of the required proportion of the sulphate may be added to the first stage of the process. However in any case where the acid degradation of the rock is slow the sulphate addition requires to be modified accordingly.

The residence time of the reaction mixture in the system may vary over a wide range of for example 30 minutes to 2 hours, but this is preferably of the order of 1 hour.

The total sulphate, whether as potassium sulphate or sulphuric acid, should desirably not comprise more than about 3.5 moles per mole of $P_2O_5$ in the rock; the amount of potassium sulphate should not comprise less than about 0.5 mole per mole of $P_2O_5$ in the rock.

If desired the system may be carried out with recycle of the liquid product and/or the wash liquors from the gypsum filtration stage.

The reactants employed in the present invention may be adjusted to give a fertilizer product of any desired composition. Thus for example a fertilizer containing 58 units of plant nutrients per 100 units with an analysis of $N:P_2O_5:K_2O$ of 15.25:15.25:27.5 may be obtained by reacting phosphate rock with nitric and sulphuric acids in the presence of potassium sulphate in the manner prescribed above, filtering off the calcium sulphate, adding more nitric acid and thereafter ammoniating, according to the following equations:

$$P_2O_5.3.5CaO + 5.43HNO_3 + 0.78H_2SO_4 + 2.71K_2SO_4$$
$$\downarrow$$
$$2H_3PO_4 + 5.43KNO_3 + 3.5CaSO_4\downarrow$$
$$\begin{array}{l} 1.355HNO_3 \\ \text{then} \\ 3.355NH_3 \end{array}$$
$$2NH_4H_2PO_4 + 5.43KNO_3 + 1.355NH_4NO_3$$

The following examples are given to illustrate the process of the present invention. The percentages quoted are by weight unless otherwise indicated.

*Example 1*

425 parts of phosphate rock ex Morocco (33.4% $P_2O_5$, 50.3% CaO) per hour were reacted continuously with 600 parts of 57% nitric acid per hour and 80 parts of 96% sulphuric acid per hour, and 473 parts of potassium sulphate per hour, and 250 parts of water per hour, at 120° C. The reaction was carried out in a stirred tank reaction vessel from which the product was removed by overflow. The residence time was 30 minutes with 0.8% $SO_4$ concentration. The product removed from the vessel was filtered on a belt filter to remove the precipitated calcium sulphate and 150 parts of 57% nitric acid per hour were added to the filtrate. 57 parts of anhydrous ammonia per hour were added to this filtrate to give, after granulation and drying, a fertilizer containing monoammonium phosphate, ammonium nitrate and potassium nitrate.

There were 5% impurities in the final product, so this fertilizer contained 58 plant units per 100 parts, and the $N:P_2O_5:K_2O$ analysis was 15.25:15.25:27.5. The precipitated calcium sulphate was essentially free from syngenite and pentasalt.

*Example 2*

425 parts of phosphate rock ex Morocco (33.4% $P_2O_5$, 50.3% CaO) per hour were reacted continuously with 334 parts of 57% nitric acid per hour, 203 parts of 96% sulphuric acid per hour, and 263 parts of potassium sulphate together with 300 parts of water per hour at 120° C. The reaction was carried out in a stirred tank reaction vessel from which the product was removed by overflow. The residence time was 1½ hours with $SO_4$ concentration of 1.2%. The liquid product removed continously was filtered using a belt filter to remove the precipitated calcium sulphate, and 508 parts of 57% nitric acid per hour were added to the filtrate.

Ammonium was added to the filtrate at a rate of 129 parts per hour. After granulation and drying a fertilizer containing mono- and diammonium phosphate, ammonium nitrate and potassium nitrate were produced.

The final product contained 51 plant units, having an $N:P_2O_5:K_2O$ ratio of 3:2:2, the analysis being

22:14.5:14.5

The precipitated calcium sulphate was essentially free from syngenite and pentasalt.

Example 3

410 parts per hour of unground (−16 mesh) phosphate rock ex Florida (34.6% $P_2O_5$, 48% CaO) were added to the first tank of three tanks in a continuous stirred tank reaction system, maintained at 120° C. with a retention time of 20 minutes in each tank. Into the first tank were also added 278 parts of 70% sulphuric acid per hour, 334 parts of 57% nitric acid per hour, 176 parts of potassium sulphate per hour and 250 parts of water per hour. Into the second tank were added 87 parts of potassium sulphate per hour. The soluble sulphate was maintained at 1.1%.

After overflowing from the third tank, the slurry was filtered to remove calcium sulphate and 283 parts of 57% nitric acid per hour were added to the filtrate. Ammonia was then added at a rate of 77 parts per hour.

After granulation and drying a 1:1:1, $N:P_2O_5:K_2O$ ratio fertilizer was obtained, comprising 55 plant units and the analysis being 18.25:18.25:18.25. The precipitated calcium sulphate was essentially free from syngenite and pentasalt.

Example 4

Morocco phosphate rock (33.4% $P_2O_5$) equivalent to 100 parts of $P_2O_5$ per hour were reacted continuously with 277.5 parts of potassium sulphate per hour, 88.3 parts of 98% sulphuric acid per hour, 304 parts of 66% nitric acid per hour, together with 600 parts of filter washings and recycle per hour at 130° C. During this continuous acidulation reaction the sulphate concentration of the liquid phase was controlled at 2.0% w./w. sulphate. The apparatus employed is shown schematically in the accompanying drawing.

The precipitated anhydrite was filtered off upon a continuous belt filter and 121.5 parts of 66% nitric acid per hour were added to the filtrate, 45.7 parts of anhydrous ammonia per hour were added to the filtrate to give, after granulation and drying a fertilizer containing 56 plant nutrients which analysed at 16:16:24, $N:P_2O_5:K_2O$. The filter cake was washed with water and the washings recycled. The precipitated calcium sulphate was essentially in the form of anhydrite.

Example 5

Florida phosphate rock (33.5% $P_2O_5$) equivalent to 100 parts of $P_2O_5$ per hour were reacted continuously with 277.5 parts of potassium sulphate per hour, 101.3 parts of 98% sulphuric acid per hour, 304 parts of 66% nitric acid per hour, together with 600 parts of filter washings and recycle per hour at 105° C. During this continuous acidulation reaction the sulphate concentration of the liquid phase was controlled at 6.0% w./w. sulphate.

The precipitated anhydrite was filtered off upon a continuous filter and 121.5 parts of 66% nitric acid per hour were added to the filtrate, 45.7 parts of anhydrous ammonia per hour were added to the filtrate to give, after granulation and drying, a fertilizer containing 56 plant nutrients, which analysed at 16:16:24, $N:P_2O_5:K_2O$. The filter cake was washed with water and the washings recycled. The precipitated calcium sulphate was essentially in the form of anhydrite.

Solely by way of comparison Florida phosphate rock (33.5% $P_2O_5$) equivalent to 100 parts of $P_2O_5$ per hour were reacted continuously with 277.5 parts of potassium sulphate per hour, 96.3 parts of 98% sulphuric acid per hour and 304 parts of nitric acid per hour, together with 600 parts of filter washings and recycle per hour at 55° C. The sulphate concentration of the liquid phase was maintained at 1.9% w./w. sulphate. The slurry overflowing to the filter contained calcium sulphate in the form of pentasalt and syngenite, and operation in this way led to substantial losses of optassium.

Example 6

Unground (−16 mesh) Morocco phosphate rock (33.4% $P_2O_5$) equivalent to 100 parts of $P_2O_5$ per hour were added to the first tank of three tanks in a continuous stirred tank reactor system with overflow, maintained at 120° C. with a retention time of 20 minutes in each tank. Into the first tank were also added 190 parts of potassium sulphate per hour, 96.3 parts of 98% sulphuric acid per hour and 304 parts of 66% nitric acid per hour, together with 600 parts of filter washings and recycle. Into the second tank were added 87.5 parts of potassium sulphate per hour. The sulphate concentration of the liquid phase was controlled at 4% w./w. sulphate.

After overflowing from the third tank, the precipitated calcium sulphate was filtered off upon a continuous filter and 121.5 parts of 66% nitric acid per hour were added to the filtrate, 45.7 parts of anhydrous ammonia per hour were added to the filtrate to give, after granulation and drying, a fertilizer containing 56 plant nutrients which analysed at 16:16:24, $N:P_2O_5:K_2O$. The filter cake was washed with water and the washings recycled. The precipitated calcium sulphate was essentially free from syngenite and pentasalt.

Solely by way of comparison unground (−16 mesh) Morocco rock (33.4% $P_2O_5$) equivalent to 100 parts of $P_2O_5$ per hour were reacted continuously with 277.5 parts of potassium sulphate per hour 109 parts of 98% sulphuric acid per hour, 304 parts of 66% nitric acid per hour, together with 600 parts of filter washings and recycle per hour at 125° C., in a continuously stirred tank reactor system exactly as described above with a retention time of 20 minutes in each tank. The sulphate concentration of the liquid phase was maintained at 10% sulphate. The calcium sulphate in the slurry overflowing from the third tank was in the form of pentasalt ($5CaSO_4 \cdot K_2SO_4 \cdot H_2O$) and operation in this way led to substantial losses of potassium.

Similarly solely by way of comparison unground (−16 mesh) Morocco rock (33.4% $P_2O_5$) equivalent to 100 parts of $P_2O_5$ per hour were reacted continuously with 277.5 parts of potassium sulphate per hour, 114 parts of 98% sulphuric acid per hour, 304 parts of 66% nitric acid per hour, together with 600 parts of filter washings and recycle per hour. The sulphate concentration in the liquid phase was maintained at 12%. The reaction was carried out at a temperature of 140° C., in a continuous stirred tank reactor system of three tanks exactly as described above with a holding time of 20 minutes in each tank. The slurry overflowing from the third tank contained large quantities of unreacted rock and syngenite ($CaSO_4 \cdot K_2SO_4 \cdot H_2O$), and thus conversion of the rock was low coupled with substantial losses of potassium.

Example 7

Unground (−16 mesh) Morocco phosphate rock (33.4% $P_2O_5$) equivalent to 142 parts of $P_2O_5$ per hour were added to the first tank of three tanks in a continuous stirred reactor system, with overflow maintained at 120° C. with a retention time of 30 minutes in each tank. Into the first tank were also added 459 parts of potassium sulphate per hour, 1,105 parts of 57% nitric acid per hour, together with 1,200 parts of filter washings and recycle. Into the second tank were added 150 parts of potassium sulphate per hour. The sulphate concentration of the liquid phase of the slurry was controlled at 2.5% w./w. sulphate.

After overflowing from the third tank the precipitated anhydrite was filtered off upon a continuous filter and 85 parts of anhydrous ammonia per hour were added to the filtrate. After granulation and drying a fertilizer having a ratio of 1.5:1.2:2.32, $N:P_2O_5:K_2O$ ratio was obtained. The precipitated calcium sulphate was essentially in the form of anhydrite.

We claim:

1. A continuous process for the production of a phosphate fertilizer, which comprises acidulating phosphate rock with from 5 to 15 moles of nitric acid per mole of $P_2O_5$ contained in the rock, adding potassium sulphate to the acidulated product at such a rate that the soluble sulphate concentration in the liquid phase is maintained within the range of about 0.5 to 8%, maintaining the reaction temperature in the range of above 90° and up to 140° C., and continuously removing the reaction product from the reaction system; whereby said reaction product comprises calcium sulphate preponderantly to substantially entirely in the form of anhydrite.

2. A continuous process for the production of a phosphate fertilizer, which comprises mixing together in a stirred tank reaction system phosphate rock, at least 3 moles of nitric acid per mole of $P_2O_5$ contained in the rock, potassium sulphate and sulphuric acid, maintaining the reaction temperature in the range of above 90° and up to 140° C., adding further potassium sulphate and sulphuric acid at such a rate that the soluble sulphate concentration in the liquid phase is maintained within the range of about 0.5 to 8%, the total acidity being equivalent to 5–15 moles of nitric acid per mole of $P_2O_5$ contained in the rock, continuously removing the reaction product from the reaction system, and adding a neutralizing agent to the reaction product; whereby said reaction product comprises calcium sulphate preponderantly to substantially entirely in the form of anhydrite.

3. A continuous process as claimed in claim 2 wherein the nitric acid is of a concentration in the range of about 40 to 80% by weight.

4. A continuous process as claimed in claim 2 wherein the sulphuric acid being added is of a concentration in the range of 50 to 100% by weight.

5. A process as claimed in claim 2 wherein the phosphate rock is a calcium phosphate type rock.

6. A process as claimed in claim 2 wherein the concentration of soluble sulphate in the liquid phase is maintained within the range of about 1 to 3%.

7. A process as claimed in claim 2 wherein the reaction temperature is maintained at about 120° C.

8. A process as claimed in claim 2 wherein the total amount of sulphate ion added in the form of potassium sulphate and of sulphuric acid is maximally about 3.5 moles per mole of $P_2O_5$ in the rock.

9. A process as claimed in claim 2 wherein at least 0.5 of potassium sulphate are added per mole of $P_2O_5$ in the rock.

10. A continuous process for the production of a phosphate fertilizer, which comprises mixing together in a multiple stirred tank reaction system phosphate rock and at least 3 moles of nitric acid per mole of $P_2O_5$ contained in the rock, causing the reaction mixture to flow through the reaction tanks of the system in series, maintaining throughout the reaction a temperature in the range of above 90° and up to 140° C., adding potassium sulphate and sulphuric acid at such a rate that the soluble sulphate concentration in the liquid phase is maintained within the range of about 0.5 to 8%, the total acidity being equivalent to 5–15 moles fo nitric acid per mole of $P_2O_5$ contained in the rock, and continuously removing the reaction product from the reaction system; whereby said reaction product comprises calcium sulphate preponderantly to substantially entirely in the form of anhydrite.

11. A continuous process as claimed in claim 10 wherein part of the reactants are added to at least one of the second and subsequent tanks, in the reaction system.

12. A continuous process for the production of a phosphate fertilizer which comprises mixing together in a stirred tank reaction system phosphate rock, at least 3 moles of nitric acid and at least 0.5 mole of potassium sulphate per mole of $P_2O_5$ in the said rock, and sulphuric acid in such amount that the total acidity of nitric acid and sulphuric acid is at least equivalent to 5 moles of nitric acid per mole of $P_2O_5$ in the rock, the total amount of sulphate ion added being maximally 3.5 moles per mole of $P_2O_5$ in the rock, maintaining throughout the reaction a temperature in the range of above 90° and up to 140° C., maintaining a soluble sulphate concentration in the range of about 0.5 to 8%, and continuously removing the reaction product from the system and separating the product liquor from the precipitated calcium sulphate in the reaction product said calcium sulphate being preponderantly to substantially entirely in the form of anhydrite.

13. A continuous process for the production of a phosphate fertilizer which comprises mixing together in a stirred tank reaction system phosphate rock, at least 3 moles of nitric acid per mole of $P_2O_5$ in the rock, potassium sulphate and sulphuric acid, maintaining throughout the reaction a temperature in the range of above 90° and up to 140° C., adding during the reaction a member selected from the group consisting of potassium sulphate and sulphuric acid, in such amount that the total acidity of nitric acid and sulphuric acid is at least equivalent to 5 moles of nitric acid per mole of $P_2O_5$ in the rock, and that the number of sulphate ions added is substantially in excess of the rate of formation of calcium ions, maintaining the soluble sulphate concentration in the liquid phase within the range of 1 to 3%, and continuously removing the reaction product from the reaction system; whereby said reaction product comprises calcium sulphate preponderantly to substantially entirely in the form of anhydrite.

References Cited in the file of this patent

UNITED STATES PATENTS

| | | |
|---|---|---|
| 1,517,687 | Voerkelius | Dec. 2, 1924 |
| 1,788,828 | Goldberg et al. | Jan. 13, 1931 |
| 1,876,501 | Johnson | Sept. 6, 1932 |